(12) United States Patent
Vásquez et al.

(10) Patent No.: US 7,716,386 B1
(45) Date of Patent: May 11, 2010

(54) COMPONENT IDENTIFICATION AND TRANSMISSION SYSTEM

(75) Inventors: Alejandro Emilio Vásquez, Raleigh, NC (US); Andrey L. Tsigler, Hillsborough, NC (US); Hassan Elmosallamy Ibrahim Hassan, Apex, NC (US); Katherine Marie McDowell, Raleigh, NC (US)

(73) Assignee: Broadcom Corporation, Irvine, CA (US)

( * ) Notice: Subject to any disclaimer, the term of this patent is extended or adjusted under 35 U.S.C. 154(b) by 168 days.

(21) Appl. No.: 11/252,202

(22) Filed: Oct. 17, 2005

Related U.S. Application Data

(60) Provisional application No. 60/619,173, filed on Oct. 15, 2004.

(51) Int. Cl.
*G06F 13/24* (2006.01)
(52) U.S. Cl. .......................... 710/19; 710/301
(58) Field of Classification Search ............ 710/18, 710/19, 301, 302; 713/1, 100; 709/223, 709/224
See application file for complete search history.

(56) References Cited

U.S. PATENT DOCUMENTS

| | | | | |
|---|---|---|---|---|
| 5,105,421 A | * | 4/1992 | Gingell | 370/363 |
| 5,590,124 A | | 12/1996 | Robins | |
| 5,930,496 A | * | 7/1999 | MacLaren et al. | 703/23 |
| 6,012,143 A | * | 1/2000 | Tanaka | 726/20 |
| 6,081,850 A | * | 6/2000 | Garney | 710/15 |
| 6,269,099 B1 | | 7/2001 | Borella et al. | |
| 6,269,416 B1 | * | 7/2001 | Meier et al. | 710/301 |
| 6,373,837 B1 | * | 4/2002 | Kleyman et al. | 370/352 |
| 6,512,768 B1 | | 1/2003 | Thomas | |
| 6,528,904 B1 | * | 3/2003 | Wong | 307/140 |
| 6,715,019 B1 | * | 3/2004 | Benson et al. | 710/305 |
| 7,002,961 B1 | * | 2/2006 | Lane et al. | 370/395.1 |
| 7,103,761 B2 | * | 9/2006 | Larson et al. | 713/1 |
| 7,188,205 B2 | * | 3/2007 | Le et al. | 710/300 |
| 7,313,614 B2 | | 12/2007 | Considine et al. | |
| 7,463,625 B2 | | 12/2008 | Salett et al. | |
| 2003/0033464 A1 | * | 2/2003 | Larson et al. | 710/302 |
| 2003/0163555 A1 | * | 8/2003 | Battou et al. | 709/223 |
| 2005/0174950 A1 | | 2/2005 | Ayyagari | |

OTHER PUBLICATIONS

Crafting Distributed Software For Stackable Switches, Alex Vasquez, LVL7 Systems, CommsDesign, Jul. 29, 2004.*
McCloghrie K, et al., "Entity MIB," IETF Network Working Group Request For Comments No. 2737, Dec. 1999.
"SFTOS Configuration Guide", Version 2.1.4, (May 2005), 134 pgs.

* cited by examiner

*Primary Examiner*—Khanh Dang

(57) ABSTRACT

Embodiments of this invention comprise a modular, scalable architecture for building a variety of Layer 2/3/4+ Ethernet products and devices. Such devices comprise of a set modules. The invention provides a set of rules to handle such modules. The rules are controlled by the architectural component named card manager. The card manager uses a protocol to discover the modules that are entering or leaving the system/device. The protocol's data provides a unique way of identifying the modules that belong to the system.

11 Claims, 8 Drawing Sheets

Concatenated Message

MESSAGE TYPE: Status Update

MESSAGE TYPE: Request All Information

COMPONENT IDENTIFICATION AND TRANSMISSION SYSTEM

CROSS REFERENCE TO RELATED APPLICATIONS

This application claims priority to a U.S. Provisional Patent Application with application No. 60/619,173 entitled "COMPONENT IDENTIFICATION AND TRANSMISSION SYSTEM", which was filed on Oct. 15, 2004, which is hereby incorporated by reference in its entirety.

SUMMARY OF THE INVENTION

Disclosed embodiments comprise a component identification system which provides an architecture for connecting various electronic units, and managing and controlling the units and the system of which they are a part. Further embodiments comprise a card manager and related protocols for controlling and managing cards contained in units connected together under a component identification system architecture. Such devices comprise of a set modules. The embodiments may provide rules to handle such modules. The rules are controlled by the architectural component named card manager. The card manager uses a protocol to discover the modules that are entering or leaving the system/device. The protocol's data may provide a way of identifying the modules that belong to the system.

Related methods of operation and computer readable media are also provided. Other systems, methods, features, and advantages may be or become apparent to one skilled in the art upon examination of the following figures and detailed description. It is intended that all such additional systems, methods, features, and advantages be included within this description, and be protected by the accompanying claims.

BRIEF DESCRIPTION OF THE DRAWINGS

Reference may be made to the following figures. The components within the figures are not necessarily to scale, emphasis instead being placed upon illustrating the principles involved. Moreover, in the figures, the reference numerals designate corresponding parts or blocks throughout the different views.

Figure 1:
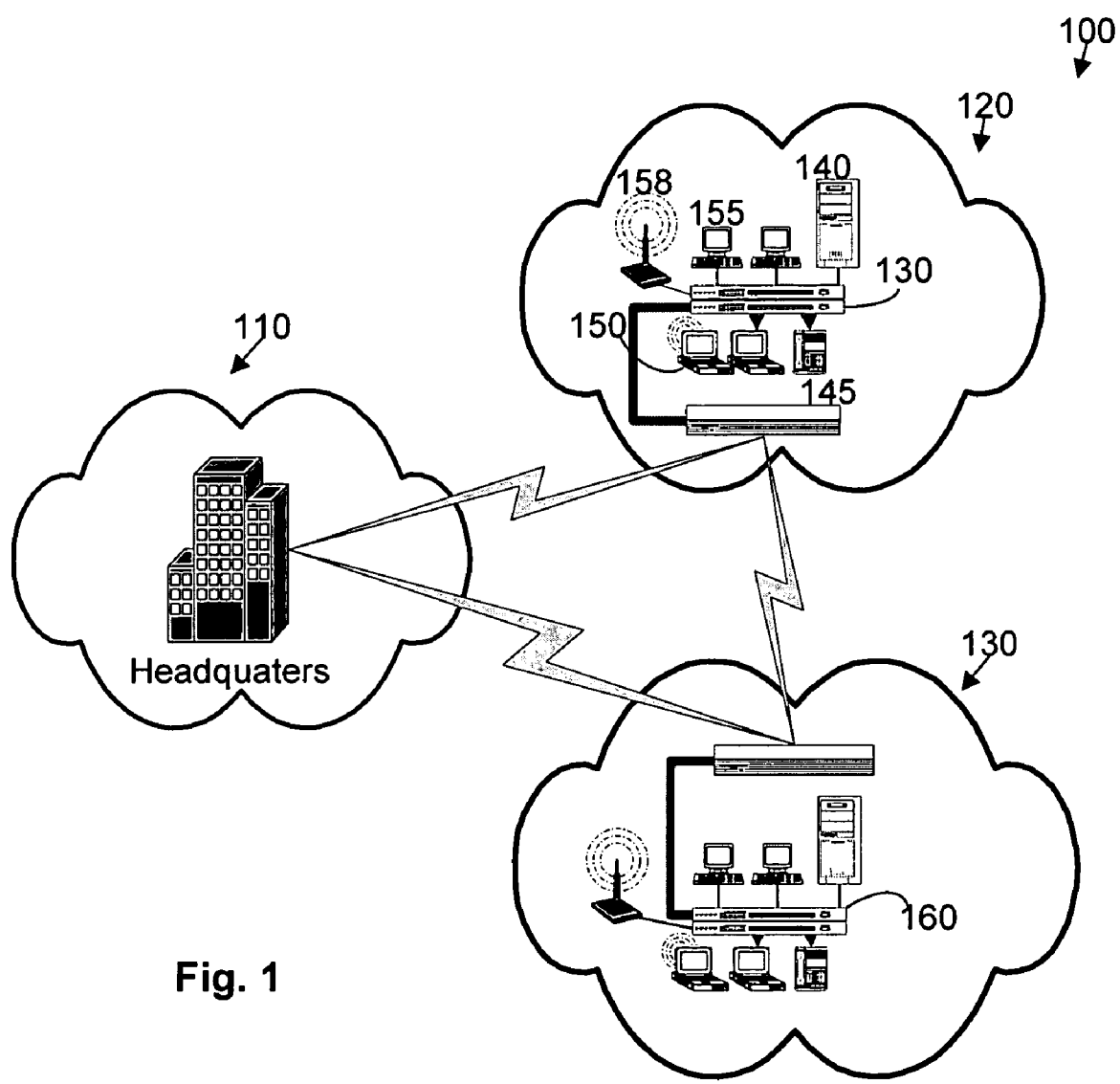
FIG. 1 is an illustrative environmental drawing for a component identification system.

While susceptible to various modifications and alternative forms, specific embodiments have been shown by way of example in the drawings and subsequently are described in detail and should be understood not to limit the invention to the particular forms disclosed, rather cover all modifications, equivalents, and alternatives falling within the spirit and scope of the appended claims.

DETAILED DESCRIPTION OF EMBODIMENTS

As used in the specification and the appended claims, the singular forms "a," "an" and "the" include plural referents unless the context clearly dictates otherwise. Similarly, "optional" or "optionally" means that the subsequently described event or circumstance may or may not occur, and that the description includes instances where the event or circumstance occurs and instances where it does not. For example, the phrase "optionally processes hotel transaction" means that the hotel transaction may or may not be processed and that the description includes both processing the hotel transaction and not processing the hotel transaction where there is substitution.

FIG. 1 is an illustrative environmental drawing for a component identification system 100. The system 100 includes a headquarters site 110, a remote site 120, and a remote site 130. Each site includes numerous electronic devices, such as a local server 140, telephone 145, laptops 150, networked stations 155, and wireless access point 158. A component identifier 160 connects these electronic devices and transmits messages among them. This component identifier 160 is described in greater detail with reference to subsequent figures. One skilled in the art will appreciate that the headquarters site 110 may include at least one component identifier 160 and a plurality of associated components, though not shown. In other example embodiments, the system 100 may include as few as one site or more than three sites.

Figure 2A:
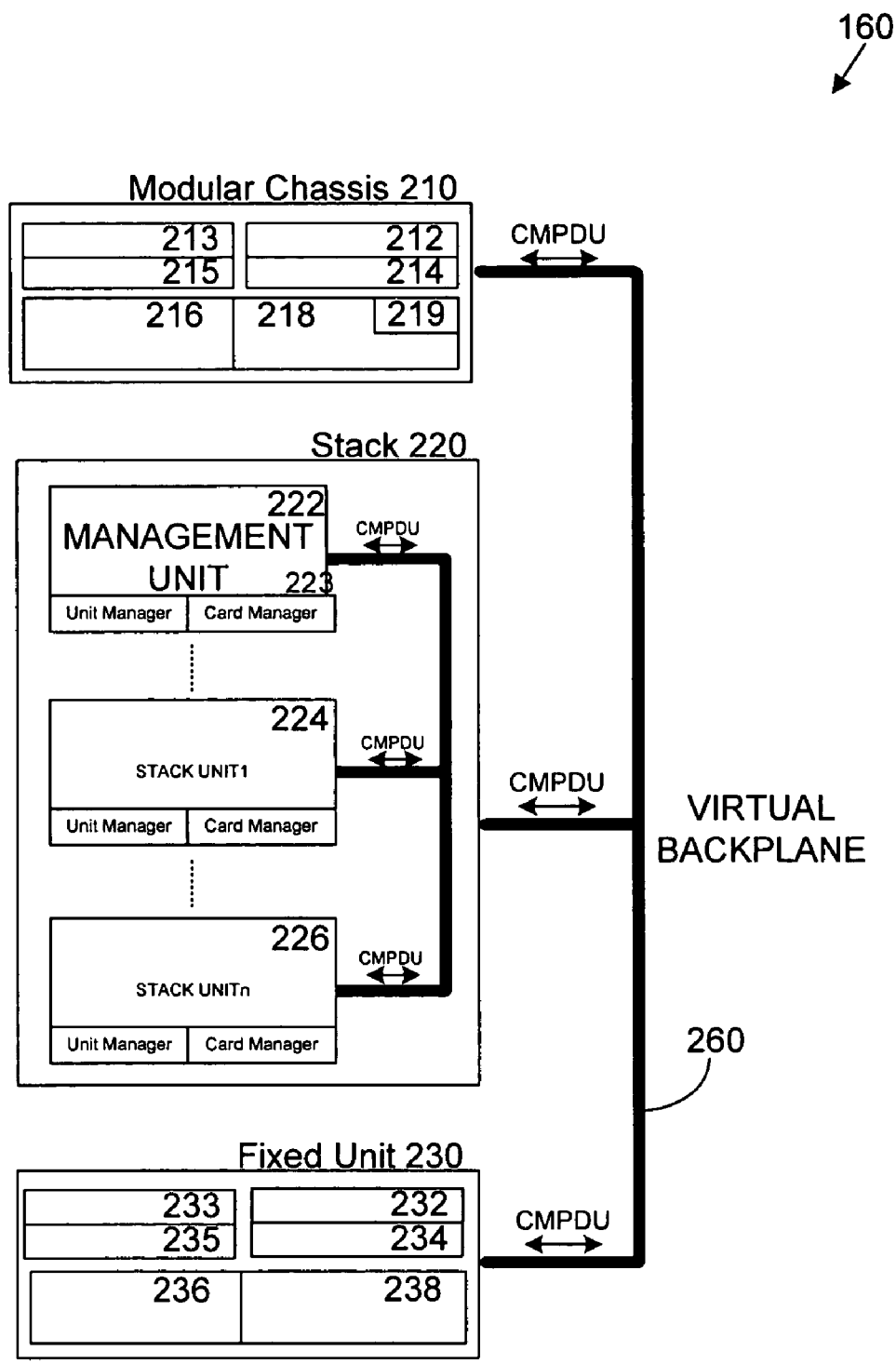
FIG. 2A is an enlarged block diagram of the component identifier of FIG. 1.

FIG. 2A is an enlarged block diagram of a component identifier 160. The component identifier 160 may include a modular chassis 210, stack 220, and a fixed unit 230. A modular chassis is an entity that is composed of modules which may be replaced and a fixed unit is an entity which modules may not be replaced. A stack may include a collection of fixed units or modular chassis connected by a virtual backplane. In an alternative embodiment, the component identifier 160 may include several modular chassis, fixed units, or some combination thereof. By varying the number and types of items (e.g., fixed units, modular chassis, and/or stacks) within the component identifier 160, the number of electronic devices (e.g., telephones 145, laptops 150) within the component identification system 100 may be varied.

A virtual backplane may connect individual items, or units, within the component identifier 160. For example, the primary virtual backplane 260 connects the modular chassis 210, stack 220, and the fixed unit 230. The virtual backplane 260 may connect a host of modular chassis, stacks, or fixed units. Types of virtual backplanes that may be used may include a 10 Gigabit Ethernet cable, wired bus, fiber optic cables, or any media that may transmit control information. If at some initial time there is only one item connected such as stack 220, the primary virtual backplane 260 may remain essentially non-operational. However, adding an additional item such as modular chassis 210 or fixed unit 230 may activate the virtual backplane 260. This addition may result in the modular chassis 210, stack 220, or fixed unit 230 being designated as the primary management unit. The primary management unit may control the transfer of information among the modular chassis 210, stack 220, and/or fixed unit 230. One skilled in the art may appreciate that modular chassis 210, stack 220, and fixed unit 230 may also form a stack, called a component identifier 160.

Each fixed unit or modular chassis may include cards. Both the modular chassis 210 and the fixed unit 230 may include slots, which may hold cards. For example, modular chassis 210 may include cards 212-215. These cards may connect the components described with reference to FIG. 1. For example, card 213 may connect the telephone 145, while card 215 connects the laptop computer 150. The card 212 may connect the local server 140 while card 214 connects the networked stations 155. Similar to the modular chassis 210, the fixed unit 230 may include cards 232-235, which may connect other components shown in FIG. 1. Though modular chassis 210 and the fixed unit 230 include four cards, the number of cards may vary. For example, there may be as few as twelve cards or as many as twenty cards.

The modular chassis 210 and the fixed unit 230 may include both a card manager and a unit manager. For example, the modular chassis 210 may include a unit manager 216 and a card manager 218 and the fixed unit 230 may include a unit manager 236 and a card manager 238. If the modular chassis 210 is designated as the management unit, it may manage the modular chassis 210, the stack 220, and the fixed unit 230. The unit manager 216 may note when a unit is connected or disconnected from the stack 160. The card manager 218 may manage both the slots and cards for the modular chassis 210 and the fixed unit 230. For example, the card manager 218 may note when a card is inserted or removed from a slot within the modular chassis 210 and the fixed unit 230.

A stack may include several fixed units or modular chassis connected by a secondary backplane. For example, the stack 220 may include a secondary management unit 222, which controls the transfer of information among the items within the stack. The secondary management unit 222 may control the transfer of information among the stack unit 224 and the stack unit 226. These stack units may be either a modular chassis or a fixed unit.

As described with reference to the modular chassis 210 and the fixed unit 230, the stack units 224, 226 may include individual cards and slots. The card manager 223 within the secondary management unit 222 may note when cards are inserted or removed from slots within the stack units 224 and 226. The card manager 223, similar to the card manager 218, may use a card manager protocol and associated flow diagrams as described below.

Figure 2B:
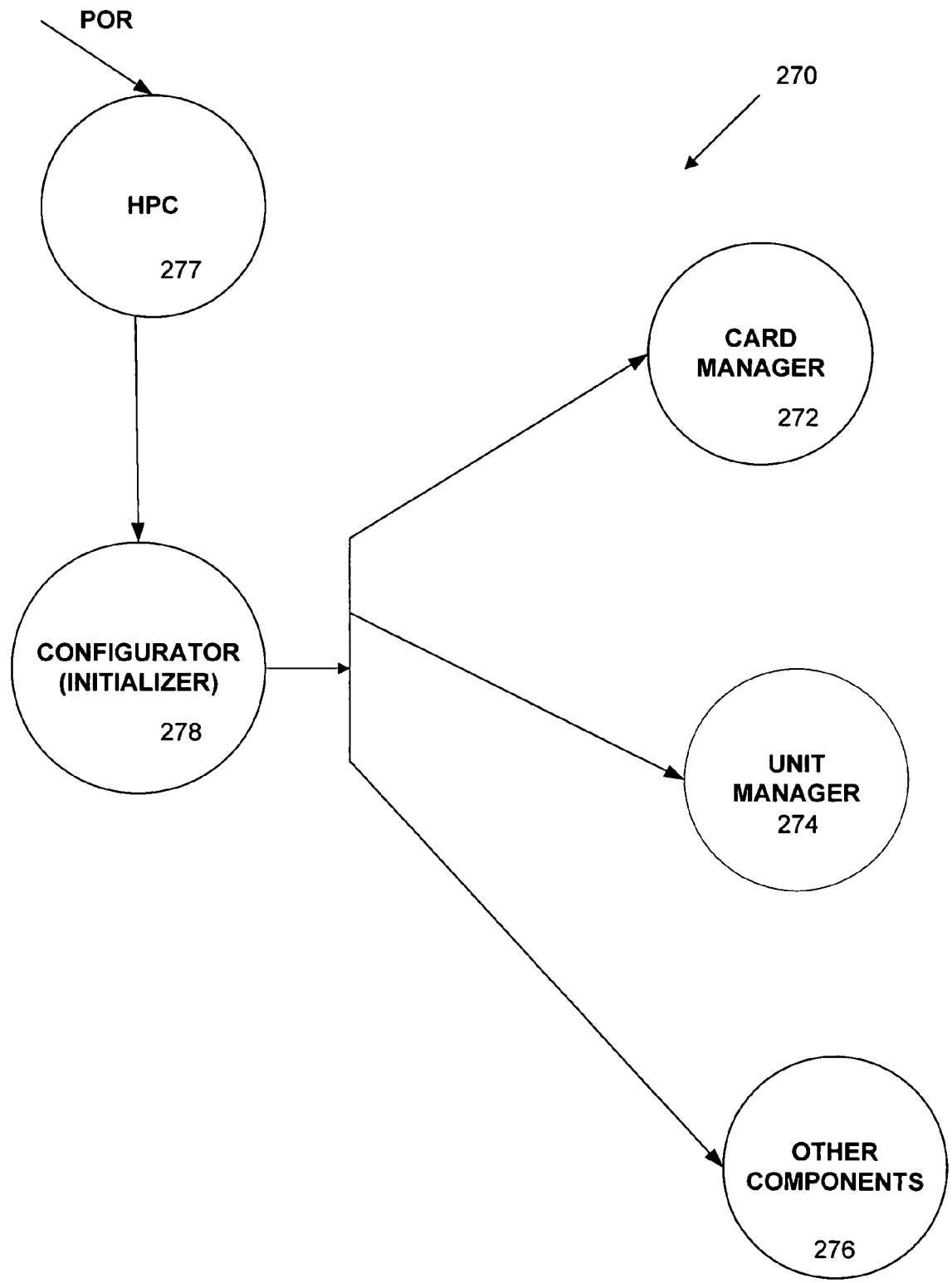
FIG. 2B is a block diagram illustrating running processes for units within the component identifier of FIG. 2A.

FIG. 2B illustrates the running processes for the fixed unit 230, modular chassis 210, and units that make up the stack 220. The FIG. 2B may illustrate the running processes for any unit 270 whether it is a fixed unit or modular chassis. The card manager 272 and the unit manager 274 of FIG. 2B may include any one of the card managers or unit managers described with the reference to FIG. 2A.

As illustrated in FIG. 2B, the card manager 272 and unit manager 274 are entities in the system. Receiving a power on reset (POR) signal powers the unit 270. This signal may be associated with either powering on the unit 270 or resetting the unit 270. The POR signal is received by the hardware platform control (HPC) 277. The HPC, as it relates to the component identification system, may establish the virtual backplane 260 described with reference to FIG. 2A. The HPC 277 forwards the POR signal to the initializer 278, which is a process responsible for configuring and initializing the system's processes. The initializer 278 then forwards the POR signal to the card manager 272 and unit manager 274. When these entities receive the POR signal, each may begin an initialization process. The unit 270 may also include other components 276, such as unit applications and a user interface. The POR signal may also prompt an initialization process for the other components 276.

Figure 2C:
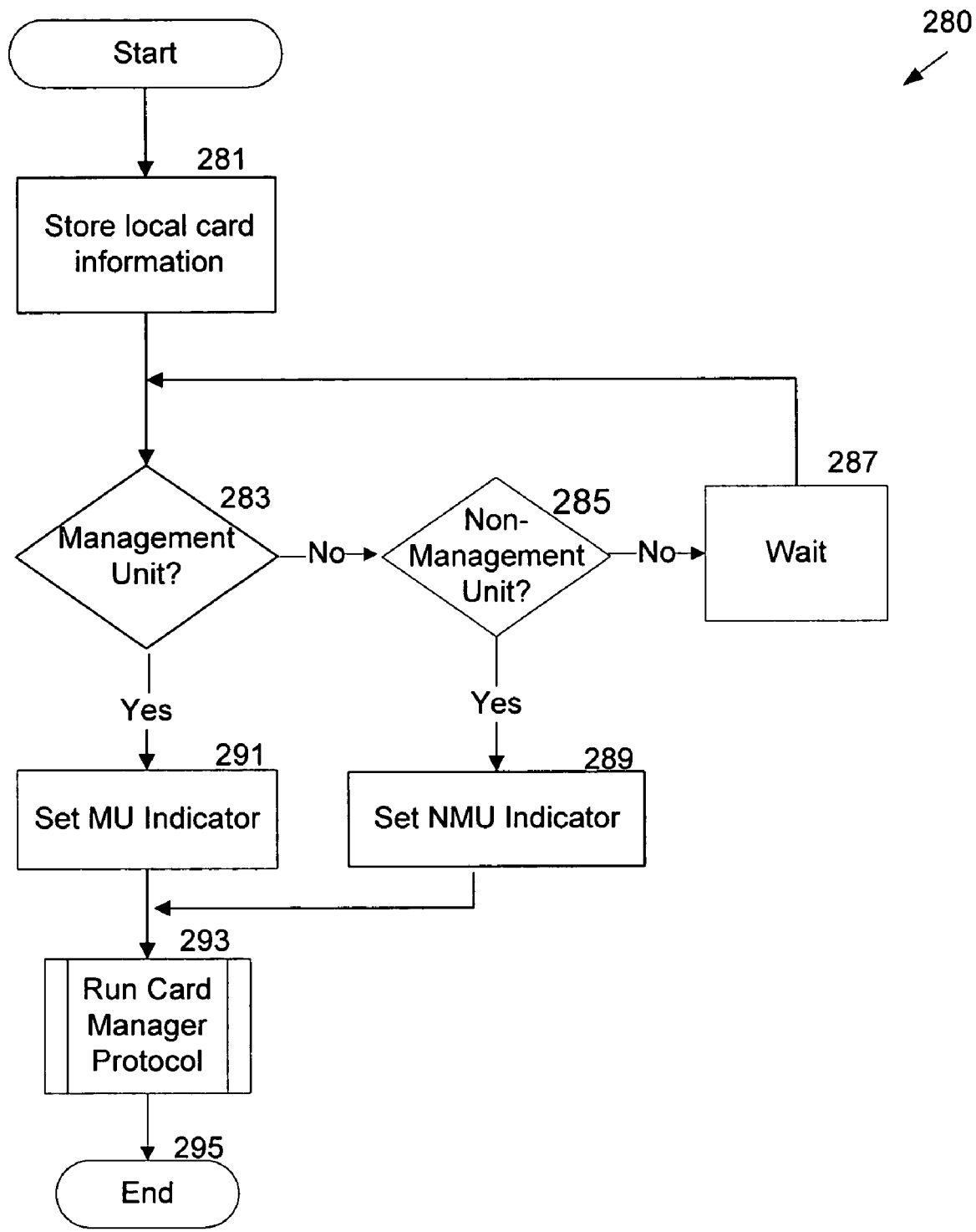
FIG. 2C is a flowchart illustrating a card initialization process for the cards of FIG. 2A.

The card manager 272 may begin a card manager initilization process after receiving the POR signal, which is illustrated in flowchart 280 of FIG. 2C. Any process descriptions or blocks in the flowcharts may be understood as representing modules, segments, or portions of code, which may include one or more executable instructions for implementing specific logical functions or blocks in the process. Alternative implementations are included within the scope of the invention in which functions may be executed out of order from that shown or discussed, including substantially concurrently or in reverse order, depending on the functionality involved, as may be understood by those reasonably skilled in the art.

In block 281, local card information is stored. As mentioned with reference to FIG. 2A, a card manager may oversee the operation of the cards in the component identifier 160, when that card manager is a part of the management unit. Local cards are cards that are physically located within the same device as the card manager. For example, cards 212-215 are local with respect to the card manager 218. In contrast, cards 212-215 are not local with respect to the card manager 238. Each of the card managers acquires local card information, such as the number of cards present in each unit, the power state of each card, and the type of cards.

At block 283, it may be determined whether the unit 270 is the management unit. As referenced with regards to FIG. 2B, the management unit may regulate the transfer of information among units in the stack. To assess whether the unit 270 is the management unit, subroutines more fully described in co-pending U.S. patent application Ser. No. 11/252,366, entitled "Component Identification and Management Unit" by Vasquez et al filed on Oct. 17, 2005, and incorporated herein by reference, are utilized.

If the unit 270 is not a management unit, the "no" branch is followed to block 285. In block 285 it may be determined whether the unit 270 is a non-management unit. A non-management unit (NMU) is a unit within a stack in which another unit is designated the management unit, which is explained in more detail with reference to block 280.

If the unit 270 is not a non-management unit, the "no" branch is followed to block 287, which activates a wait state. This wait state may last for 10 minutes, 2 hours, or some other suitable time period that satisfies system constraints. System constraints may include unit POR, or loss of the existing management unit. After the wait state is completed, a second attempt is made at assessing whether the unit 270 is a management unit. If it is determined that the answers to block 283 and block 285 are both "no," then there may not be a unit within the stack designated as the management unit, then the block 283 should be repeated.

If the unit 270 is a NMU, the "yes" branch is followed to block 289. In block 289, an NMU indicator is set, which may indicate that the card manager is within a non-management unit. By setting this indicator, certain card manager functionality, such as managing network interfaces, may be disabled. The NMU indicator may be located within the unit manager.

If it is determined in block 283 that the unit 270 is a management unit, the "yes" branch is followed to block 291. In block 291, the management unit (MU) indicator is set. The management unit indicator may indicate that the card manager is within a management unit. Setting the management unit indicator may prompt certain functionality within the card manager, which is described in greater detail with reference to subsequent figures. The subroutine 280 sets or notes whether the card manager is within a management unit.

Blocks 289, 291 are followed by block 293. A card manager protocol is run in block 293. In block 293, the subroutine 280 runs a card manager protocol. The card manager protocol controls the card manager's operation and manner that messages are transported among stack units. The card manager protocol is described in greater detail with reference to FIGS. 2-5. After block 293, the card manager initialization process ends at block 295.

Returning to FIG. 2A, a card manager protocol may control the card manager's operation and manner that messages are transported among units in the stack. For example, the card manager 218 may transmit a message to the fixed unit 230 using the card manager protocol 219. The card manager protocol may use timers that trigger when information is transmitted among the cards. For example, the card manager protocol 219 may generate a concatenated message sent from the card manager 218 within the modular chassis 210. This message may travel along the primary virtual backplane 260 to both stack 220 and the fixed unit 230. The card manager 238 may then process the received message if it relates to one of its cards. Otherwise, the card manager 223 within the secondary management unit 222 may process the message because it relates to a card within one of its stack units. This example presupposes that a message from modular chasis 210 is directed only to the stack 220 or the fixed unit 230. The manner by which the card manager protocol 219 transmits messages is described with reference to FIG. 3.

The card manager 218 differs from the card manager 223 and the card manager 238 because the card manager 223 is located with the modular chassis 210, which is designated as the primary management unit. The process of designating one of the stack units as the primary management unit is done by the unit manager and is described in co-pending, U.S. patent application Ser. No. 11/252,366, "Component Identification and Management Unit" by Vasquez et al filed on Oct. 17, 2005. Because the modular chassis 210 is the primary management unit, the card manager protocol 219 for the card manager 218 will run the stack managing routine 400 depicted in FIG. 4. In contrast to the stack managing routine 400, the card manager 223 and the card manager 238 will run the management routine 300 depicted in FIG. 3. In a different embodiment, either the card manager 223 or the card manager 238 may be the card manager for the primary management unit.

Figure 3:
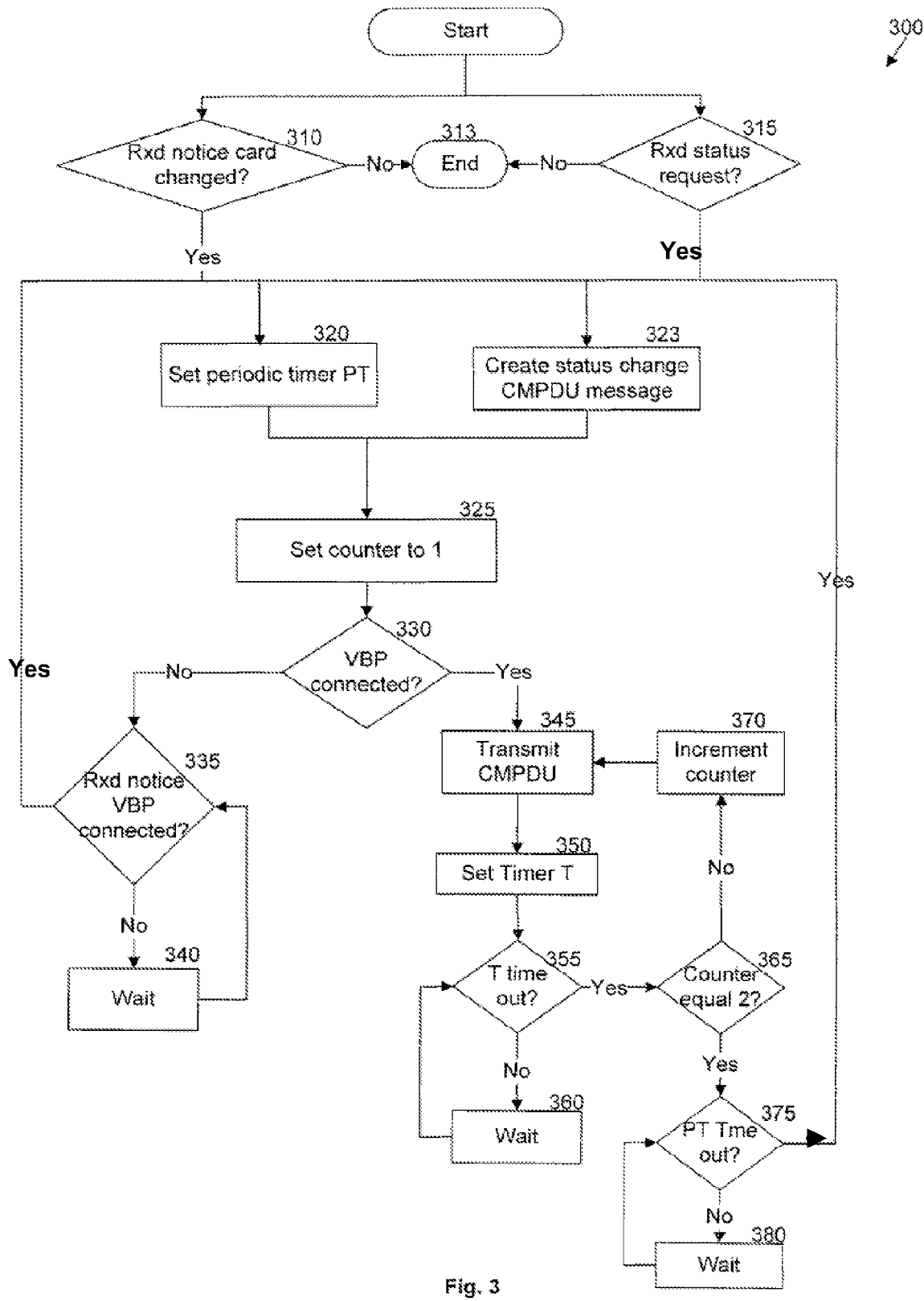
FIG. 3 is a flowchart of a management routine that a card manager protocol runs when located within a non-management unit.

FIG. 3 is a flow diagram of a managing routine 300 that each individual card manager protocol runs when located within a non-management unit. In FIG. 3, the managing routine 300 begins with the determination blocks 310 and 315. In block 310, the routine 300 determines whether a notice is received indicating that a card's state has changed. This may involve notice that either a card within the unit was unplugged or plugged in. For example, there may be a sensor assigned to cards 213-215. Then for example, if the card 213 and the card 214 are removed from the modular chassis 210, their sensors may send notices as described in block 310. If a status change notice is not received, the "no" branch is followed from block 310 to the end block 313.

The managing routine 300 may also begin by determining whether it received a request for a status update in block 315. The request for the status update may come from the card manager 218 in the managing modular chassis 210. If it did not receive a request for a status update in block 315, the routine 300 follows the "no" branch from block 315 to the end block 313.

Together, the decision blocks 310 and 315 demand that the routine 300 does not begin until it either receives notice that a card changed state or receives a request for a status update. When either occurs, the routine 300 may follow "yes" branch and both resets a periodic timer PT in block 320 and creates a status change card manager portable data unit (CMPDU) message in block 323. The recycle time for the periodic timer PT may be 15 seconds, 20 seconds, or some other system specific frequency.

To create the status change message, the routine 300 may identify the unit card that has changed state, such as modular chassis 210. The routine 300 may also identify the type of message, such as a status change message, receive notice card change message, or some other suitable message. If both the card 213 and the card 215 change state simultaneously, then the routine 300 in creating this status change message may form a concatenated message. In block 323, the concatenated message may include the relevant information for both cards. The content of the concatenated message is described in co-pending U.S. patent application Ser. No. 11/252,366, entitled "Component Identification and Management Unit" by Vasquez et al. filed on Oct. 17, 2005.

Block 320 and block 323 are followed by block 325 where the routine 300 sets the counter to one. Block 325 is followed by block 330. In block 330, the routine 300 determines whether the virtual backplane is connected. For example, the card manager 218 may determine if the primary virtual backplane 260 is connected (See FIG. 2). If it is not connected, the "no" branch is followed from block 330 to block 335. In block 335, the routine 300 determines whether it received notice that the virtual backplane is connected. If the notice is not received, the "no" branch is followed from block 335 to block 340. In block 340, the routine 300 may wait a designated amount of time, such as fifteen seconds, twenty seconds, or some other system specific value. The routine 300 may then repeat block 335. Once the notice that the virtual backplane is connected is received, the "yes" branch is followed from block 335 to block 320 and block 323.

If the routine 300 determined that the primary backplane 260 is connected in block 330, the routine 300 follows the "yes" branch from block 330 to block 345. In block 345, the routine 300 transmits the concatenated message to the stack units. For example, the card manager 218 may transmit the message to the modular chassis 210 and the fixed unit 230. The card manager 238 may quickly process the message and determine if it is directed to one of the cards within fixed unit 230. If it is not, the card manager 238 will ignore the message. The card manager 218 for the management unit which had been previously designated by the managing unit will note that it needed the information. With this information, the managing unit will begin running the stack management routine 400 described with reference to FIG. 4.

Block 345 is followed by block 350 in which the routine 300 sets a timer T to a fifteen second, a twenty second, or some other system specific frequency. Block 355 follows block 350. In block 355, the routine 300 determines if the timer T timed out. If this timer did not time out, the "no" branch is followed from block 355 to block 360. The routine 300 waits a designated period of time, such as fifteen seconds, twenty seconds, or some other system specific frequency. The routine 300 then repeats block 355.

When timer T has timed out, the "yes" branch is followed from block 355 to block 365. In block 365, the routine 300 determines if the counter has a value of two. If the counter value is not two, the routine 300 follows the "no" branch from 365 to block 370. In block 370, the routine 300 increments the counter. Block 370 is followed by block 345 in which the routine 300 transmits the CMPDU message. Using these blocks, the routine 300 may transmit the message twice to all the units connected to the primary virtual backplane 260 instead of specifically targeting a unit and requesting an acknowledgement from the targeted unit.

If the counter value is equal to two, the "yes" branch is followed from block 365 to block 375. In block 375, the routine 300 determines if the periodic timer PT has timed out. If it has not timed out, the "no" branch is followed from block 375 to block 380. In block 380, the routine 300 waits a designated period and then repeats the block 375. Like the other timers, the frequency for the periodic timer PT may be fifteen seconds, twenty seconds, or some other system specific frequency. When the periodic timer PT has timed out, the "yes" branch is followed from block 375 to blocks 320 and 323. One skilled in the art may appreciate that this final loop causes the routine 300 to periodically generate and transmit messages.

Figure 4:
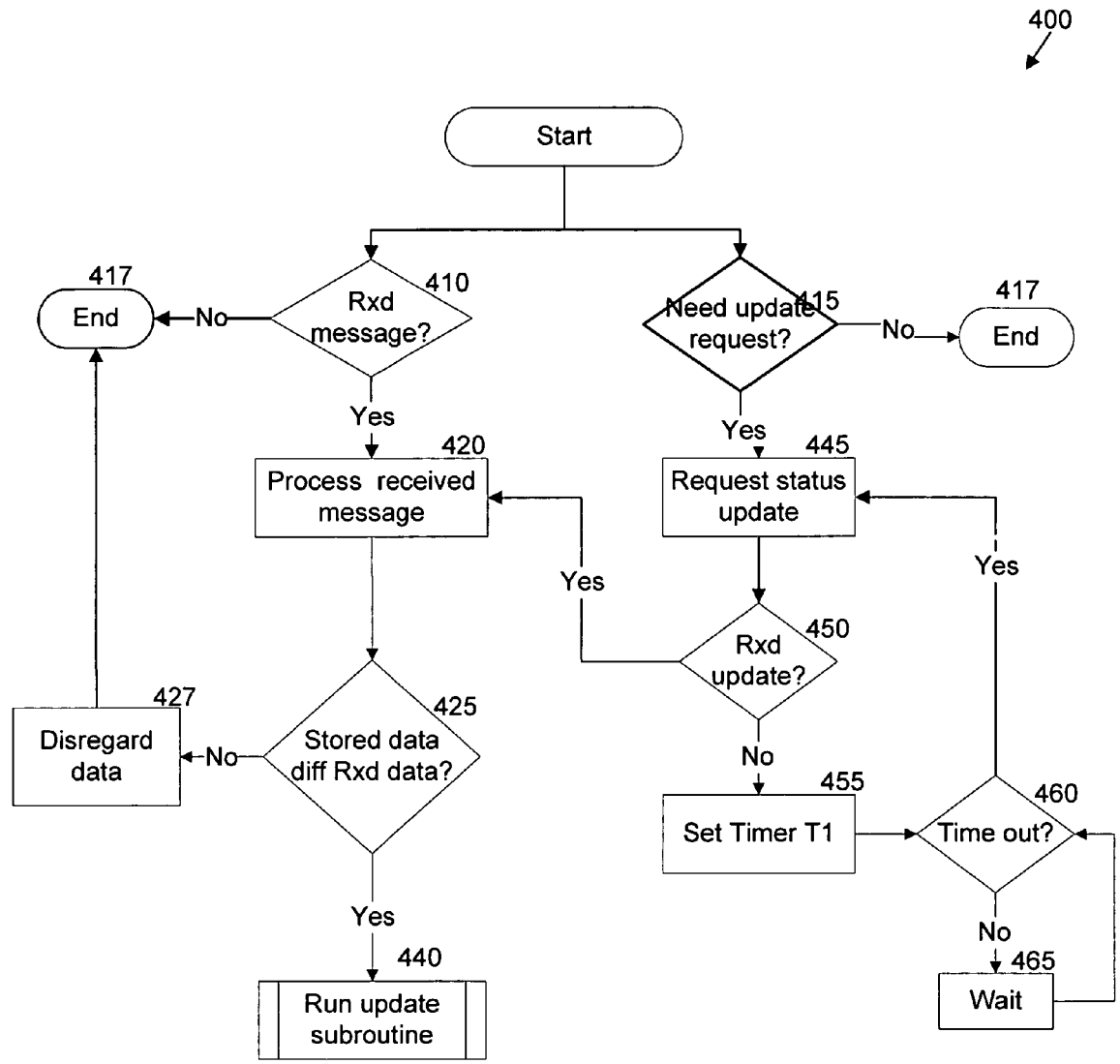
FIG. 4 is a flowchart of a stack managing routine that a card manager protocol runs when located within a management unit.

FIG. 4 is a flowchart of a card managing routine 400 that begins with determination blocks 410 and 415. In block 410, the routine 400 determines whether it has received a concatenated message. This may occur when one of the card managers transmits a message as described with reference to FIG. 3. If the routine 400 did not receive a message, the "no" branch is followed from block 410 to the end block 417.

If the routine 400 did receive a message, the "yes" branch is followed from block 410 to block 420. In block 420, the routine 400 processes the received message. This processing may involve validating and authenticating the message by the card manager. Block 425 follows block 420. In block 425, the routine 400 determines if the stored data is different than the data in the received message. In the block 425, the received data is compared to data stored in a lookup table, or some other suitable method. If the data is not different, the routine 400 follows the "no" branch from block 425 to block 427 and disregards the data. After block 427, the routine 400 ends at block 417. If the received data is different than the stored data, the "yes" branch is followed from block 425 to block 440. In block 440, the routine 400 runs the update subroutine, which is described with reference to FIG. 5.

If the routine 400 determines there is not a need for an update request in block 415, the "no" branch is followed from block 415 to the end block 417. If there is a need, the "yes" branch is followed from block 415 to block 445. In block 445, the routine 400 requests a status update. In other words, the routine 400 may generate a concatenated message identifying cards that need to submit information, which may be transmitted to the units in the stack.

Block 450 follows block 445. In block 450, the routine 400 determines whether it received the requested update. If the update has been received, the routine 400 follows the "yes" branch from block 450 to block 420. In block 420 the routine 400 processes the received message as described above.

If the update is not received in block 450, the routine 400 follows the "no" branch to block 455. In block 455, the routine 400 sets the timer T1. The timer frequency may be fifteen seconds, twenty seconds, or some other system specific frequency. The decision block 460 follows block 455. In block 460, the routine 400 may determine whether the timer Ti has timed out. If it has not timed out, the "no" branch is followed from block 460 to block 465. In block 465, the routine 400 waits a designated period of time and then repeats block 460. The wait period may be fifteen seconds, twenty seconds, or some other system specific frequency. If the timer T1 did time out in block 460, the routine 400 follows the "yes" branch from block 460 to block 445. The routine 400 may transmit a second request since the requested update has not been received.

Figure 5:
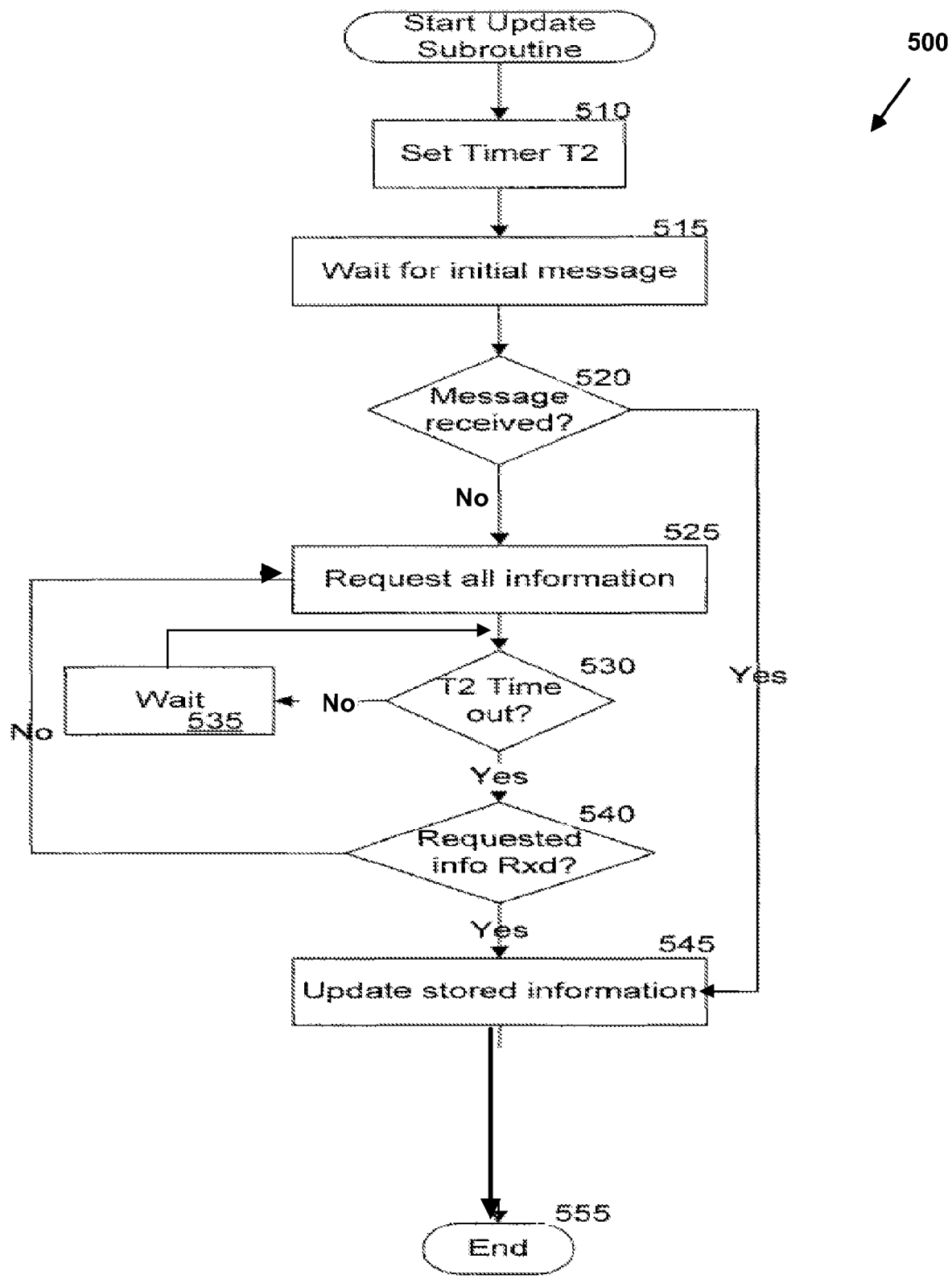
FIG. 5 is a flowchart of an update subroutine used with the stack managing subroutine of FIG. 4.

FIG. 5 is a flow diagram of an update subroutine 500 used with the card managing routine 400. The routine 500 begins by setting a timer T2 in block 510. The timer frequency may be fifteen seconds, twenty seconds, or some other system specific frequency. Block 515 follows block 510 where the routine 500 waits for an initial data message. The data message may come from individual card managers such as card managers 218, 222 and 238. The data message may be generated when a card has changed state or is transmitted in response to a status request as described with reference to FIG. 3.

If the initial message is not received, the "no" branch is followed from block 520 to block 525. In block 525, the routine 500 transmits a request for all information to a specific unit in the stack. In block 525, the routine 500 may identify the stack unit with information that has changed and transmits the request to that unit. This process is further described with reference to FIG. 6C.

Block 530 follows block 525 where the routine 500 determines if the timer T2 has timed out. If the timer has not timed out, the "no" branch is followed from block 530 to block 535. In block 535, the routine 500 waits a designated period of time and then repeats block 530.

When the timer T2 has timed out, the "yes" branch is followed from block 530 to block 540. In block 540, the subroutine 500 determines if the requested information is received. If the requested information has not been received, the "no" branch is followed from block 540 to block 525 where the information may be requested again. This loop allows the subroutine 500 to periodically seek previously requested information until it is received.

If the information is received in block 540 or block 520, the subroutine 500 follows the "yes" branch from block 540 or block 520 to block 545. In block 545, this subroutine updates the stored information with the received information. Block 545 is followed by the end block 555.

Figure 6A:
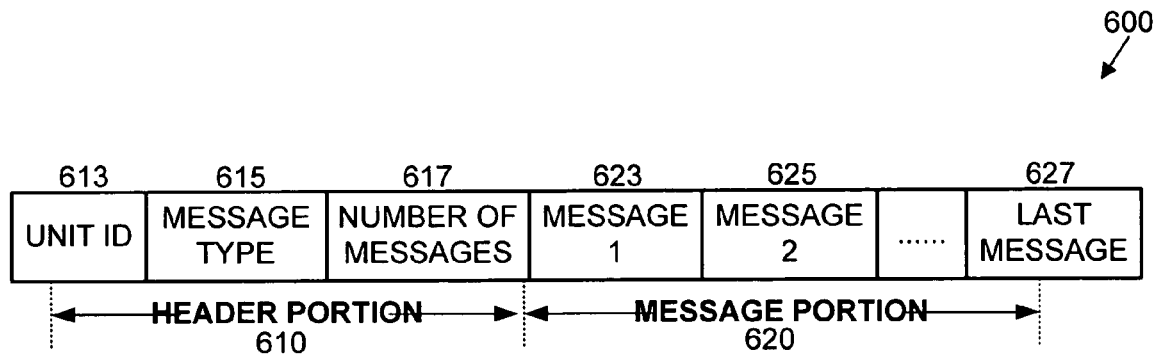
FIGS. 6A-6C are block diagrams that indicate both the structure and contents of the concatenated messages.
Figure 6B:
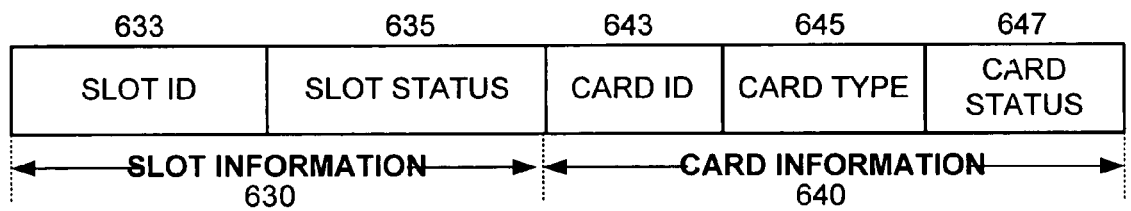
Figure 6C:
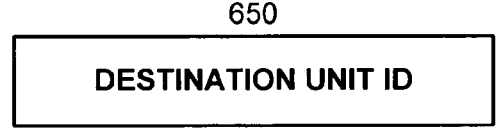

Turning now to FIGS. 6A-6C, these figures are block diagrams that indicate both the structure and content of the concatenated messages. The transmitted messages described with reference to FIGS. 3-5 are concatenated messages that do not use a message acknowledgement and are sent to every device connected to the virtual backplane. These messages have the structure described with reference to FIG. 6A and the content described with reference to FIG. 6B and FIG. 6C.

FIG. 6A is a block diagram that indicates the general structure of a concatenated message 600. The message 600 includes a header portion 610 and a messages portion 620. The header portion 610 may include a unit identification compartment 613, message type compartment 615, and number of messages compartment 617.

The unit identification compartment 613 includes a unique identification number that indicates the stack unit where the message originated. For example, the message may come from modular chassis 210, stack 220, or fixed unit 230 described with reference to FIG. 2A. Then for example, the unit manager 216 may assign an identification number for modular chassis 210, stack 220, or fixed unit 230.

The message type compartment 615 indicates the type of message sent. For example, the type of message may include status-update messages or request-all messages. However, more than two message types may be used in other example embodiments. If more than two message types are used, the message compartment may use a two digit numeral to indicate the type of message sent.

The number of messages compartment 617 indicates how many messages are being sent as a part of the concatenated messages. For example, the card manager 218 may send three messages corresponding to status changes in cards 212-215 in a single concatenated message. Then for example, the number in the compartment 617 may indicate three.

The message portion 620 includes multiple compartments labeled 623, 625, and 627. Though only three compartments are labeled, the message portion 620 may include as many as 10, 12, or some other system suitable number compartments. As cards are plugged into or removed from slots during one of the cycle times, these compartments are filled. For example, during one cycle time only one card may be either added to or removed from a slot in the stack, may result in only filling the message compartment 623. Or for example, if two cards are either removed or added to a slot, then both the compartment 623 and the compartment 625 may be filled. Then for example, the card that is removed or added to the stack first has information placed in the compartment 623 and the latter has information placed in the compartment 625.

FIG. 6B indicates the contents of a status update message stored within the message portion 620 of FIG. 6A. Message 623 may be a status update message and may include slot information portion 630 and card information portion 640. In other example embodiments, a status update message may include two or more portions, wherein the other system components may be adjusted accordingly.

The slot information portion 630 may include a slot identification compartment 633 and a slot status compartment 635. A system designer may assign unique slot identification numbers when the system is designed, wherein there may be as few as two or three slots to as many as twelve slots depending on the unit's functionality. The slot status compartment 635 may indicate whether a card is located in a given slot. For example, values for this compartment may include numerical values that indicate whether a slot is empty or full. Or for example, the values may include power on and power off.

The card information portion 640 may include a card identification compartment 643, card type compartment 645, and card status compartment 647. Similar to the slot identification compartment 633, the card identification compartment 643 may represent a numerical value that indicates which card is associated with the message. Similar to the slot identification, a system designer may also specify the card identification. The card identification may include a symbolic alphanumeric string. For example, a card identification of GIGE24 may indicate that the card has Ethernet ports with a twenty four gigabit capacity. Together the slot identification and card identification may identify the location and type of card inserted into a slot.

The card type compartment 645 may indicate the kind of card associated with the message. For example, types of cards may include, but are not limited to, 24 fiber or copper ports 10/100/1000 Ethernet cards, and 8 port High-Gigabit Ethernet cards.

The card status compartment 647 may indicate the card's status. For example, status values may include unknown, unplugged, operational, diagnostic failed, downloading, mismatch, or unsupported. An unknown may indicate that there is a card plugged whose status is unknown, which may prompt the transmission of a status update. Diagnostic failed status may indicate that the card is not operational and a problem is detected. Downloading may indicate that the unit is sending information to the card (e.g., it is downloading). Mismatch may indicate that a card is present but does not match a unit catalog. The unit catalog may include information regarding the type of card is supported in the stack. Unsupported may indicate that the unit does not support that type of card in the slot. Alternative classifications may include testing, busy, or uploading. Testing may indicate that the unit is testing the card. Busy may indicate that the card is busy and cannot respond. Uploading may indicate that the card is transmitting information to the unit.

FIG. 6C is a block diagram that indicates the contents of the request-all message stored within the message portion 620 (of FIG. 6A). This message may differ from the update message in that it may include a single compartment 650 designated destination unit ID. That is, the unit identifier in the compartment 613 may indicate the unit that sent the information. In contrast, the destination unit identifier in the compartment 650 may indicate the unit to receive the information.

While various embodiments of the invention have been described, it may be apparent to those of ordinary skill in the art that many more embodiments and implementations are possible that are within the scope of this invention. For example, while illustrated with advertising commissions, the invention is applicable to any type of commissions. All such modifications are intended to be included within the scope of this disclosure and the present invention and protected by the following claims.

We claim:

1. A method comprising:
   determining if a first unit having a first local card manager is designated as a management unit or as a non-management unit, wherein the first unit is one of multiple units operably coupled using a virtual backplane, with each of the units comprising a local card manager;
   if the first unit is designated as a management unit, running a first card manager protocol on the first local card manager; and
   if the first unit is designated as a non-management unit, running a second card manager protocol on the first local card manager, wherein the first card manager protocol is a different protocol than the second card manager protocol,
   wherein the first card manager protocol includes
   receiving card information from each of the local card managers, the card information including a status of each of card associated with each of the local card managers;
   storing the card information as stored data;
   receiving a status change message associated with a change of the status of one or more of the cards; and
   updating the stored data based on the status change message.

2. The method of claim 1 wherein the receiving card information comprises receiving a power on reset signal.

3. The method of claim 1 wherein the receiving card information comprises receiving card information including a number of cards associated with each local card manager, a power state of each of the number of cards, and a type of card for each of the number of cards.

4. The method of claim 1 wherein the receiving card information comprises determining that a management unit indicator has been set.

5. The method of claim 1 wherein the receiving card information comprises receiving the card information including a status of one or more cards associated with one or more slots associated with each of the local card managers.

6. The method of claim 1 wherein the receiving a status change message comprises receiving a concatenated message.

7. The method of claim 6 wherein the receiving a concatenated message comprises receiving a message including card information associated with the status of two or more cards.

8. The method of claim 1 wherein the receiving a status change message comprises validating the status change message.

9. The method of claim 1 wherein the receiving a status change message comprises receiving the status change message responsive to a request for the status change message.

10. The method of claim 1 wherein the updating comprises:
   determining that card information associated with the status change message varies from the stored data; and
   updating the stored data based on the card information associated with the status change message.

11. The method of claim 1 wherein the second card manager protocol comprises:
   if a status change has occurred with one or more of multiple cards operably coupled to the first local card manager, generating a status change message; and
   communicating the status change message to a local card manager designated as the management unit.

* * * * *